Nov. 26, 1935.　　　H. T. KINGSBURY　　　2,022,422

REGISTERING BANK

Filed Aug. 9, 1932　　　6 Sheets-Sheet 1

Inventor:
Harry T. Kingsbury,

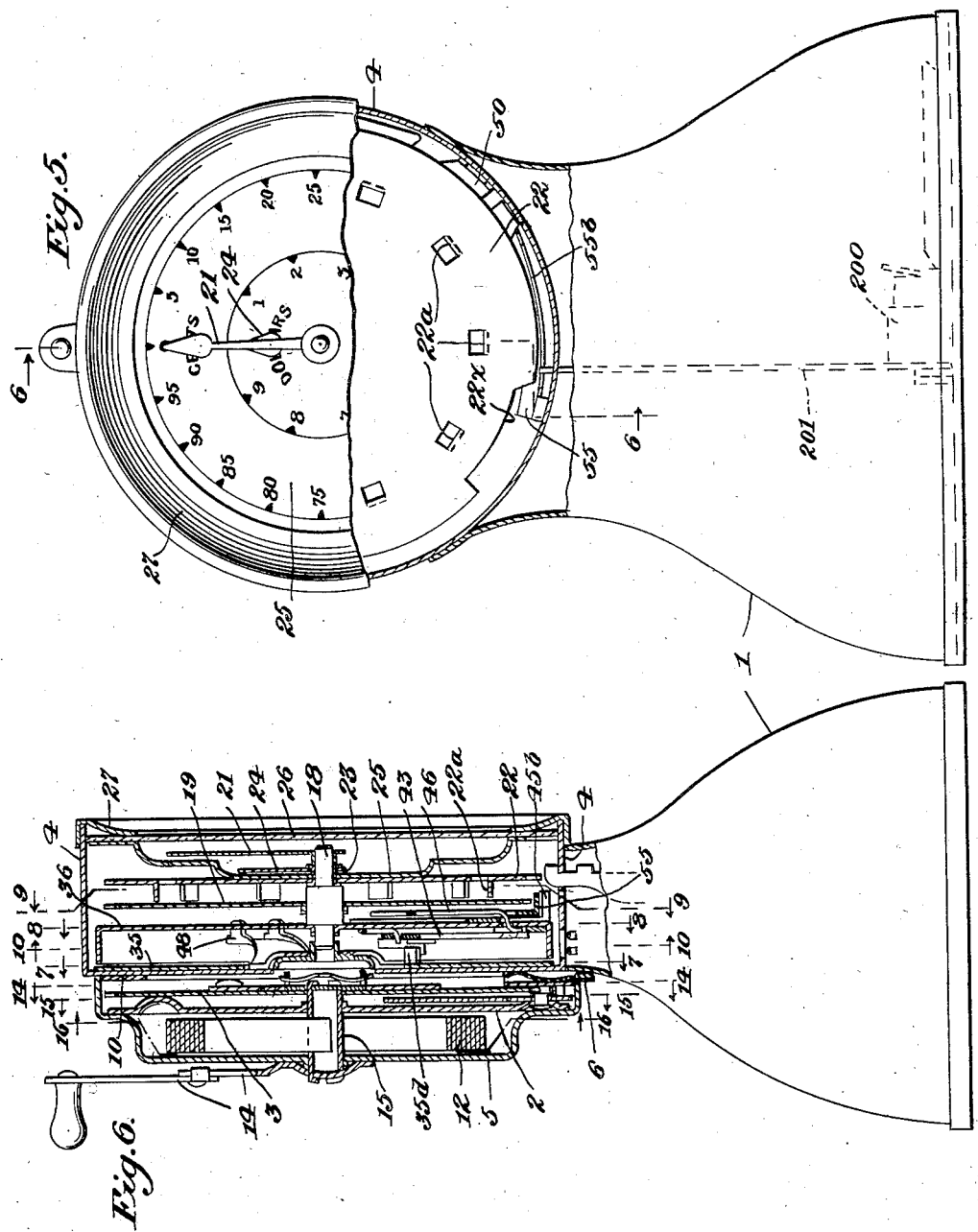

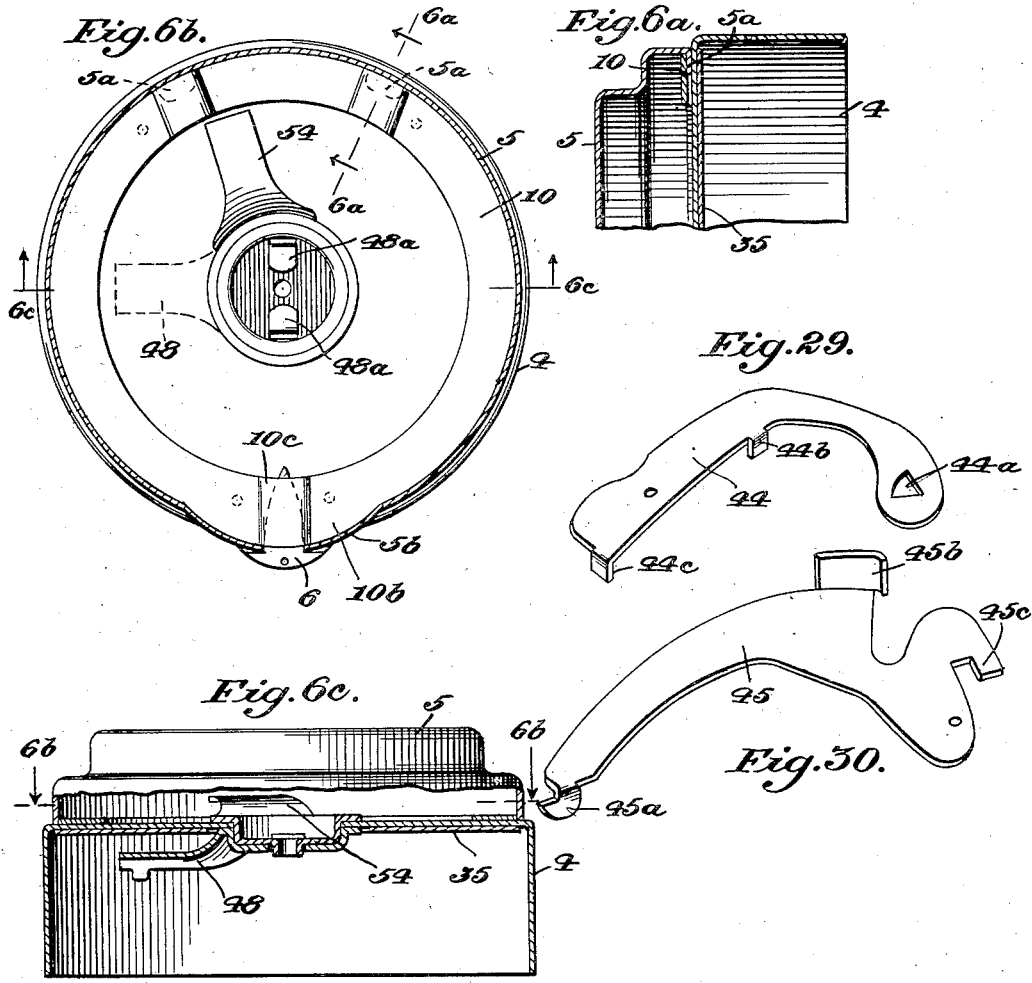

Nov. 26, 1935.  H. T. KINGSBURY  2,022,422
REGISTERING BANK
Filed Aug. 9, 1932  6 Sheets-Sheet 4
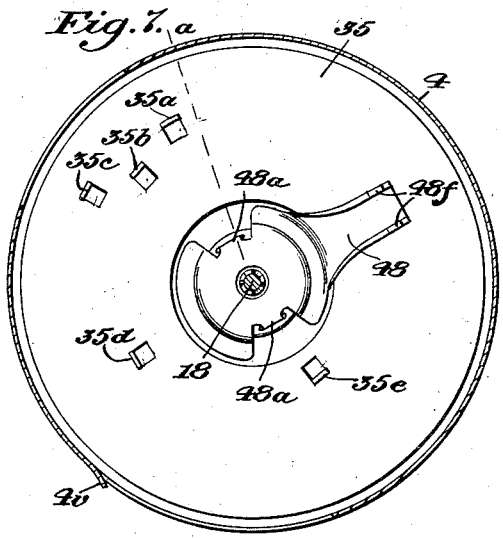
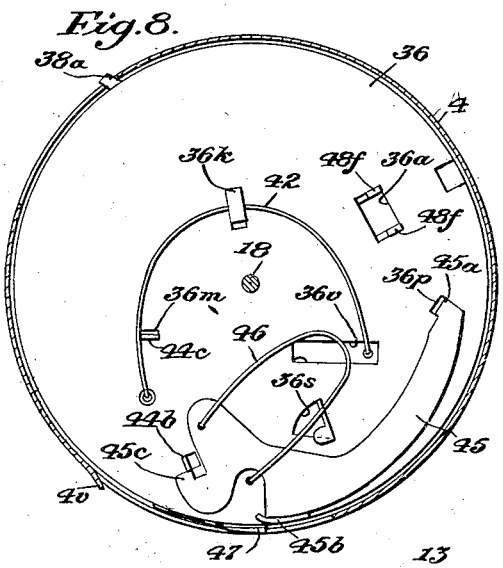
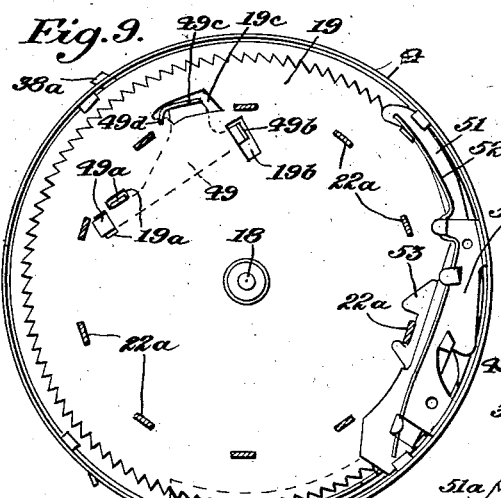
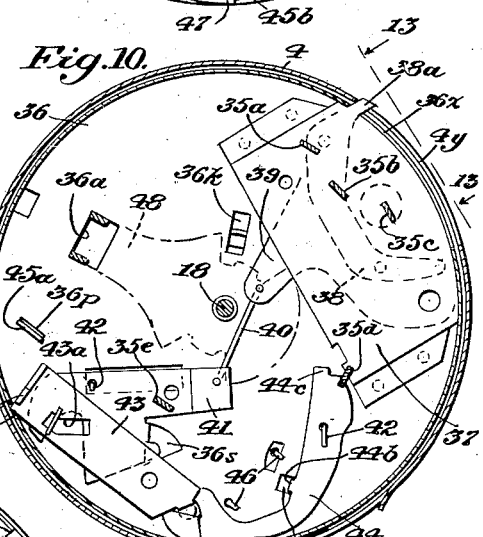
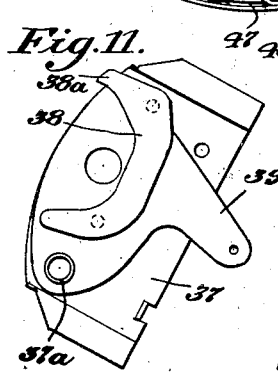
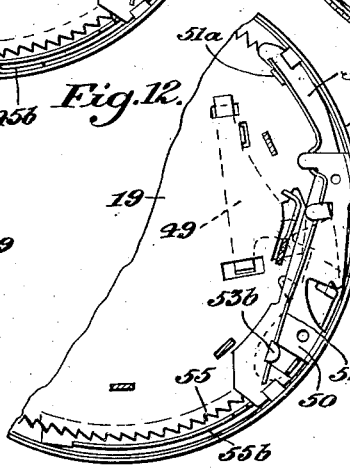
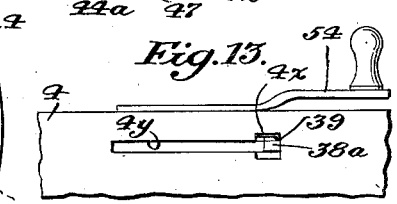
Inventor:
Harry T. Kingsbury,
by
Att'ys.

Nov. 26, 1935.  H. T. KINGSBURY  2,022,422
REGISTERING BANK
Filed Aug. 9, 1932  6 Sheets-Sheet 5
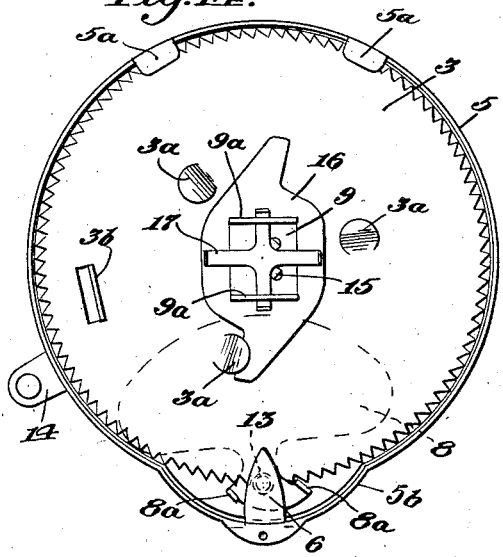
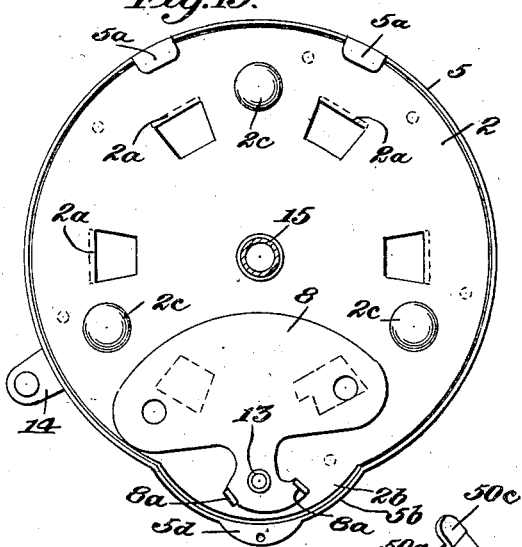
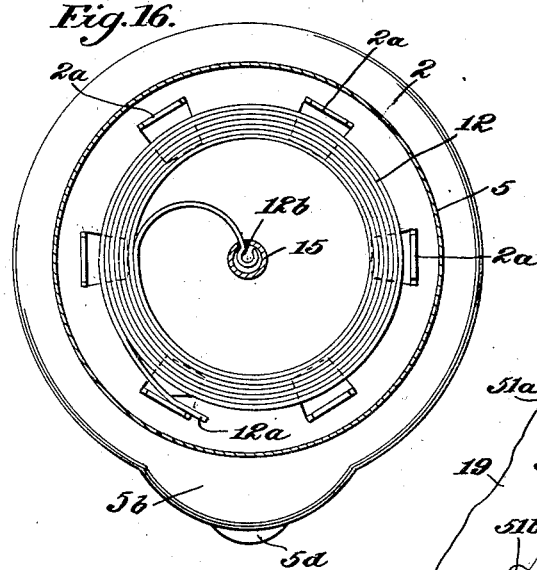
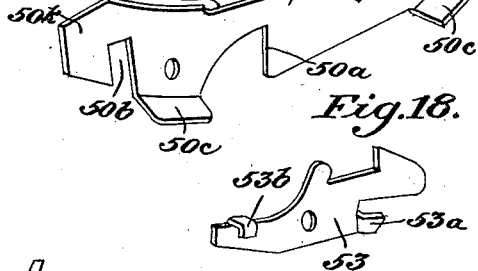
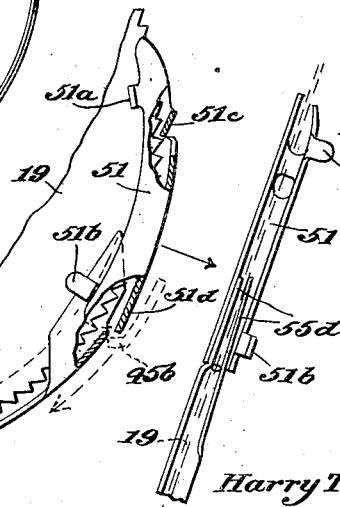
Inventor:
Harry T. Kingsbury,

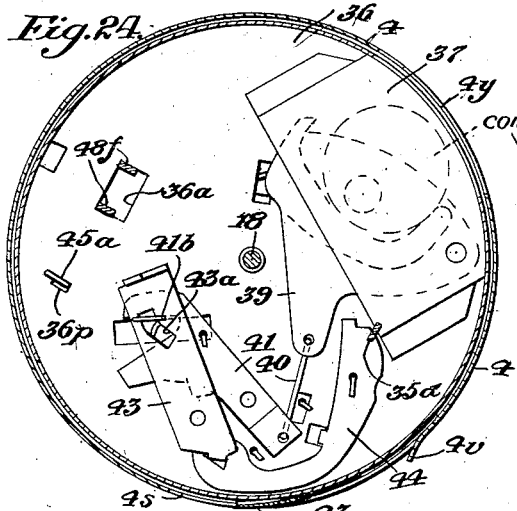
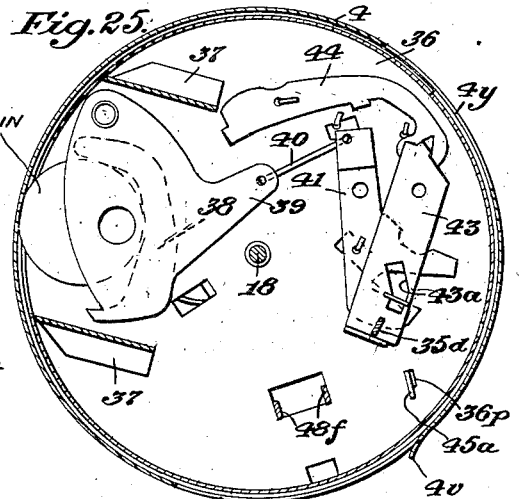
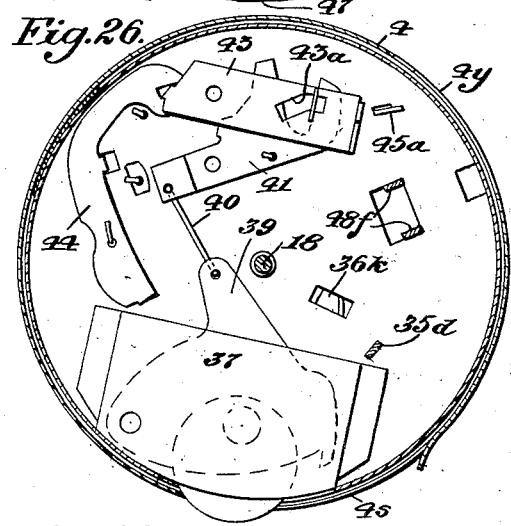
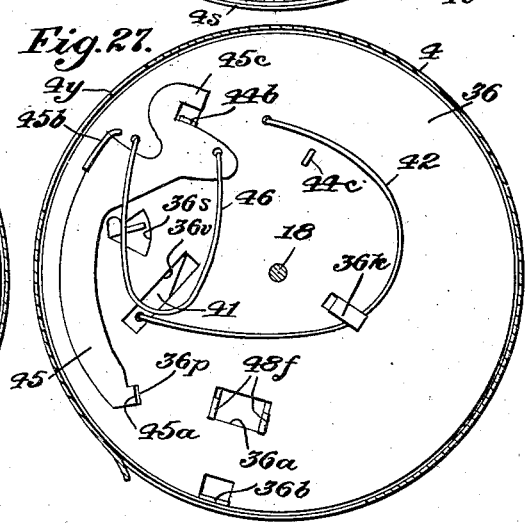
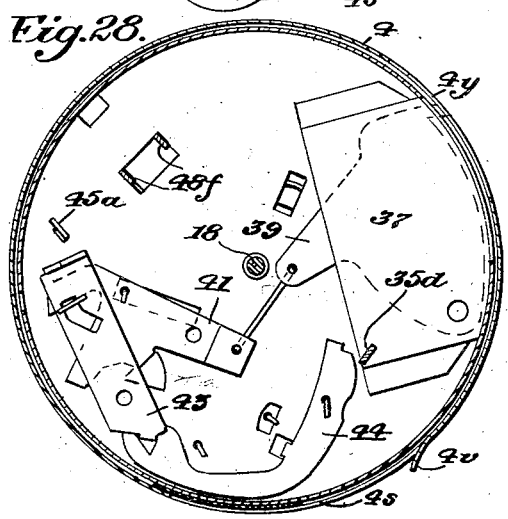
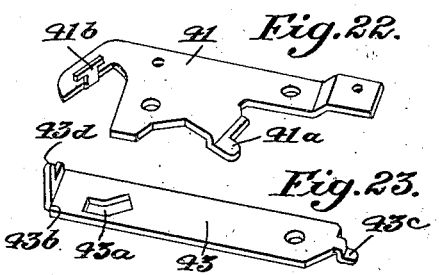

Patented Nov. 26, 1935

2,022,422

UNITED STATES PATENT OFFICE 2,022,422

REGISTERING BANK

Harry T. Kingsbury, Keene, N. H., assignor to Kingsbury Mfg. Company, Keene, N. H., a corporation of New Hampshire Application August 9, 1932, Serial No. 628,079

4 Claims. (Cl. 235—100)

This invention relates to improvements in registering banks of the automatic coin sizing type disclosed in my United States Patent 1,939,353.

One of the features of the present invention is the arrangement of the elements constituting the coin sizing and registering mechanisms in such manner that the sizing and registering is accomplished by rotative movements always in the same direction, in lieu of the reciprocating movements heretofore employed.

Another feature of the present invention is the provision of means in such a registering bank for the reception and sizing of a coin, which operate to maintain the coin in sight until motion of the receiving structure prevents the insertion of a second coin in the coin-receiving structure along with the first coin.

Another feature of the present invention is the provision of a rotatably operated coin registering system with means for preventing the return movement of the coin-receiving structure after each phase of reception and registry has been accomplished.

A still further feature of the invention is the provision of a power driving mechanism for moving the coin registering system, the power of this mechanism being released by the operation of inserting a coin into the coin-receiving structure, whereby the registering elements complete a cycle of movement dependent upon the size of the coin and then return, in their revolution, to a position for receiving a further coin, and are held in such position ready for a new actuation by the power driving means when a further coin is inserted.

A specific feature of the present invention is the provision of a registering bank comprising a casing and a member rotatable within the casing and carrying a coin-receiving structure, in conjunction with coin-releasable means for holding the receiving structure in receiving position with respect to the casing, and with devices actuated according to the size of the inserted coin for engagement, after a predetermined angular movement of the rotatable member with a selected fixed member on the casing whereby to release a counting mechanism which, after a further angular movement is thrown out of action at a point which is the same regardless of the denomination of the coin being counted.

Other features of the present invention will appear in the course of the following specification and claims, in conjunction with the accompanying drawings in which an illustrative form of construction of the registering elements, in conjunction with two types of the device for driving the same are set forth by way of examples of practicing the present invention.

In these drawings:

Figure 5 is a front elevation, partly broken away, to show the dollar transfer and receptacle locking plate.

Figure 6 is a vertical axial section substantially on line 6—6 of Figure 5.

Figure 6a is a fragmentary sectional view on line 6a—6a of Figure 6b.

Figure 6b is a vertical section substantially on line 6b—6b of Figure 6c.

Figure 6c is a top elevation wtih a portion in section, substantially on line 6c—6c of Figure 6b.

Figure 7 is a sectional view substantially on line 7—7 of Figure 6.

Figure 8 is a sectional view substantially on line 8—8 of Figure 6.

Figure 9 is a sectional view substantially on line 9—9 of Figure 6.

Figure 10 is a sectional view substantially on line 10—10 of Figure 6.

Figure 11 shows a detail of the coin-receiving structure.

Figure 12 is a view corresponding to Figure 9, but showing the parts in a different operated position.

Figure 13 is a detail view substantially on line 13—13 of Figure 4, showing the coin inserting slot.

Figure 14 is a section substantially on line 14—14 of Figure 6, showing the detached power unit.

Figure 15 is a sectional view substantially on line 15—15 of Figure 6.

Figure 16 is a sectional view substantially on line 16—16 of Figure 6 showing the power spring.

Figure 17 is a perspective view showing the stationary transfer cam on a larger scale.

Figure 18 is a perspective view showing the transfer latch, on the same larger scale.

Figure 19 is an elevation, on the same larger scale, of the penny ratchet retaining pawl and driving pawl shield members.

Figure 20 is a view of the shield member, it being seen in a radially outward direction of view.

Figure 21 is a similar view of the inter-relationship of the penny ratchet retaining pawl and the shield.

Figure 22 is a perspective view, on a similarly enlarged scale, showing the selector actuating lever.

Figure 23 is a similar view of the selector lever.

Figure 24 is a view corresponding to Figure 10, but showing the parts with a coin inserted therein.

Figure 25 is a similar view, following rotation of a coin receiving structure until the selector lever is about to engage a fixed lug.

Figure 26 is a similar view in a further rotated position, with the coin-receiving structure about to release the coin therein.

Figure 27 is a view corresponding to Figure 8, but showing the penny ratchet pawl engaged with the penny ratchet, corresponding to the position of the parts in Figure 26.

Figure 28 is a view similar to those of Figures 24, 25 and 26, but showing a further rotation of the coin-receiving structure, almost back to the initial position.

Figures 29 and 30 are perspective views of details.

Figure 3:
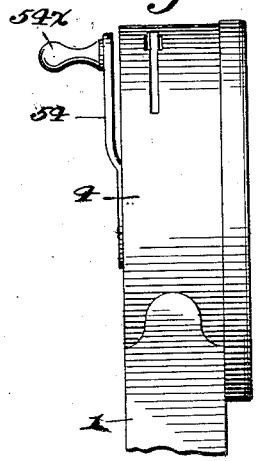
Figure 3 is a side elevation, showing a manual driving device.
Figure 4:
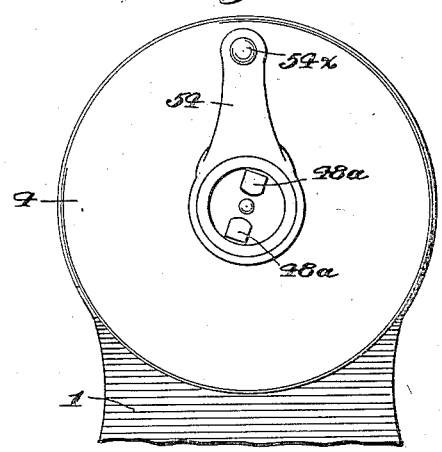
Figure 4 is a rear elevation of the manually driven device.

In these drawings a registering bank is shown as comprising coin-receiving, sizing, and registering devices mounted within a casing and adapted to operate by a single revolution at each insertion of a coin to perform the functions of sizing and registering the value of the coin. This casing is mounted upon a receptacle into which the registered coins are delivered and in which they are collected. It will be understood that this casing may be provided at its bottom with a door (Fig. 5) through which the coins may be removed, this door being provided with a lock of the type for example set forth in my co-pending application aforesaid, and including a member controlled by the registry system, so that the bank cannot be opened until a certain total value of coins has been deposited therein. The structure of the sizing and registering devices may be operated manually (Figs. 3 and 4) or by a power mechanism (Fig. 6) without any change in the sizing and registering elements. When a power driving device is utilized, the sizing and registering mechanism is retained against actuation until released normally by a coin, and then is operated by the driving device to perform a single revolution or cycle of movement during which the value of the coin is registered and the coin discharged into the receptacle, and all parts are restored back to the initial position.

Specifically, in Figures 1 to 6, the external parts of the structure, in each instance, are shown to comprise a base 1 constituting a receptacle for the registered coins, which supports at its top the casing 4 containing the sizing and registering elements and having the front closed by a dial 25 and a front crystal 26 which is held in place by a bezel 27. A penny hand 21 and a dollar hand 24 move over the indicia on the dial and thus indicate the total value of the coins which have been registered.

Figure 1:
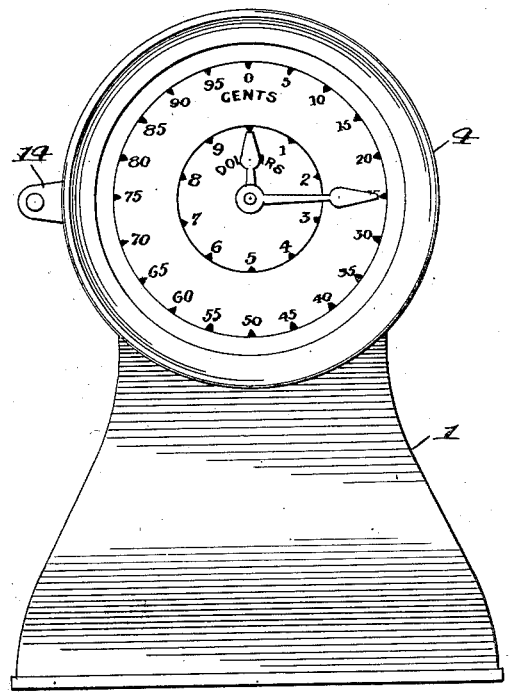
Figure 1 is a face elevation of the registering bank, showing the dial, indicator hands, and coin receptacles.
Figure 2:
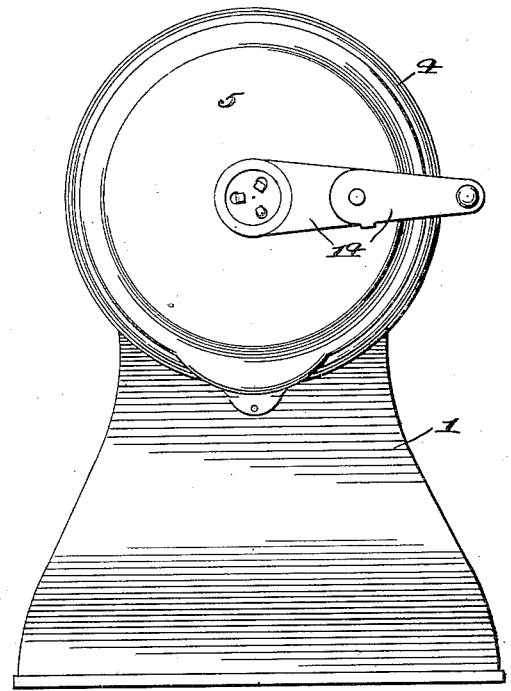
Figure 2 is a rear elevation of the same, with a driving motor in position.

In the form of the device shown in Figures 2 and 6, a power driving device is employed for operating the several elements, and comprising a spring 12 contained within a dished closing plate 5 having at its open edge the lugs 5a which may enter the spaces provided between the ring plate 10 and the back of the casing 4 to which this ring plate is welded (Fig. 6a). When the lugs 5a are within these spaces, the periphery of the dished enclosing plate 5 closely fits the ring plate 10 (Figs. 6, 6b and 6c) which is provided with a projection 10b at the bottom of the casing for fitting in a corresponding projection 5b (Figs. 6, 6b, 14, 15 and 16) of the dished closing plate 5 to prevent relative rotation of the closing plate with respect to the casing 4. When the parts are in such position, a key 6 (Figs. 6 and 14) may be inserted in a radial direction, through a peripheral slot in the power casing 5 so that it is received between an outwardly extending portion 10c of the ring plate 10 and the rear wall of the casing 4, and rests against a downwardly extending flange 5d of the power casing 5, and thus serves to hold the power casing fixedly to the main casing 4.

The spring 12 is located within the dished power casing 5 and is retained against spreading radially by the lugs 2a of a closing plate 2 which is secured (Figs. 6 and 15) within the dished power casing 5 and resting against a radial flange thereof preferably being held fixedly in position as by spot welding. One end 12a of spring 12 is retained by one of the lugs 2a, while the other end 12b extends through a slot of the hollow winding and driving shaft 15 which is provided on its outer end with projecting lugs which are passed through and crimped upon a winding handle 14 preferably formed of two parts (Figs. 2 and 6) which may be folded with respect to one another for packaging. Shaft 15 is journalled in the casing 15 and plate 2, and at its inner end is likewise provided with lugs which extend through holes in a retaining piece 9 and are clinched on the inner side thereof. A winding arm 16 has an aperture closely fitting and receiving the retaining piece 9 which has axially extending walls 9a thereon to guide the winding arm 16 in permitted axial movement with respect to the hollow shaft 15, this movement being opposed and controlled by a cross-shaped spring 17 which has two opposite arms engaged in slots of walls 9a, and the other two arms engaged with one face of the winding arm 16. Winding arm 16 is thus forced against the power escape ratchet 3 which has the inclined upwardly struck lugs 3a thereon for engagement by the winding and driving arm 16. It will be noted that three lugs 3a are provided for operation in conjunction with the two diametrically opposite parts of the winding arm 16, so that engagement occurs for each one-sixth of a revolution of the shaft 15. The power escape ratchet 3 also has a struck-out lug 3b for engaging a crank arm 54 of the sizing and registering mechanism as will be described hereinafter for the purpose of driving this arm and the associated parts.

In order to limit the speed of the driving movement, the power escape ratchet 3 engages by its peripheral teeth alternately with the inclined pawl teeth 8a of the inverted governor 8 which is mounted on a pivot stud 13 carried by the closing plate 2. This governor 8 operates as an inverted pendulum and by inertia to restrict the speed of movement of the power escape ratchet 3. It is preferred to provide the elevations 2c on closing plate 2 to hold the penny escape ratchet away from engagement with the governor 8.

The sizing and registering mechanisms (Figs. 5 to 28) are contained within the casing 4. Fixed to the rear wall of casing 4 as by the provision of a separately formed plate 35 which is spot welded to the rear wall, are the sizing lugs 35a, 35b, 35c, 35d, 35e, which are located at angular distances about the axis of a main shaft 18 from a radial reference line a which correspond respectively to 1, 5, 10, 25 and 50 teeth of the 100 tooth penny ratchet 19 (Figs. 7 and 9): and at radial distances from the axis of shaft 18 dependent upon the diameters of the coins, so that sizing lugs 35c (dime) is at the greatest radial distance, while the sizing lugs 35a (penny), 35b (nickel); 35d (quarter), and 35e (half dollar) are successively closer to the axis. It will be understood that the mechanism is being described in conjunction with the employment of the present United States currency and that by simple modifications of the dimensions of parts, it may be adapted to any other currency, regardless of the ratios of diameters and values.

The rear wall of the casing 4 has an aperture (Figs. 6, 6b and 6c) in which is fitted the cup-like center of the crank arm 54, which thus is guided in the rear wall of casing 4. A driving crank arm 48 (Figs. 6, 7 and 10) has lugs 48a which pass through and are clinched (Fig. 6b) to the crank arm 54, so that the two cranks 54 and 48 move always together. The shaft 18 is journaled at its rear end in an axially directed flange formed in the crank arm 54 (Fig. 6).

The coin-sizing and registered operating parts are mounted in and on a dish 36 (Figs. 6, 8, 10 and 24 to 28) which has secured thereto as by spot welding a coin tray piece 37 (Figs. 10 and 11) which operates in conjunction with the radial wall of dish 36 to prevent movement of the coin in an axial direction relative to the shaft 18. A cylindrical flange 37a is struck from the coin tray piece 37 and serves as a pivot for a coin sizing block 38 having a lug 38a thereon which in the "raised" position of the mechanism extends through (Figs. 10 and 13) a slot 36x in the dish and the enlarged end 4x of a slot 4y in the casing 4, and thus holds the dish against rotation with respect to the casing 4. This coin sizing block 38 is fixed to a coin sizing lever 39 which is pivotally mounted on the cylindrical flange 37a (Fig. 11).

When a coin is forced through the slots 4y, 36x, the sizing block 38 is caused to rock in a counter-clockwise direction (Fig. 10), and when the coin tray 37 has moved (Fig. 25) to a position at which the slots 4y and 36x are no longer in registry, the coin is pushed by the block 38 outward until it bears against the inner wall of casing 4, so that the inner wall of the casing operates in conjunction with the shape of the block 38 to present the coin sizing lever 39 in a predetermined angular position for each particular diameter of coin.

The movement of the coin sizing lever 39 causes a movement of the sizing link 40 and therewith of the selector actuating lever 41 which is shown in Figure 22 to comprise the offset lug structure 41a which is engaged in an aperture 36s of dish 36 to constitute a pivot for the rocking movement of lever 41. This lever also has an offset T-shaped lug 41b which is received within the slot 43a of the selector lever 43 (Figs. 10, 23, 24, 25, 26 and 28). When in the raised position, a shoulder 43b of selector lever 43 is received in an aperture 36c, whereby counter-clockwise movement of selector lever 43 relative to the dish 36 is prevented. Selector lever 43 also has an offset lug 43c engaging in an aperture 44a of a latch lever 44 which has a latch lug 44b extending through an aperture 36n in dish 36, and is provided at the end opposite the selector lever 43 with a lug 44c which extends through an aperture 36m in dish 36 to provide a pivot for the rocking movement of the latch lever 44. The coin tray 37, coin sizing lever 39, link 40, selector actuating lever 41, selector lever 43, and latch lever 44 are all contained within the dish 36. On the outside or other face of the dish is located a penny ratchet pawl 45 having a lug 45a located in an aperture 36p of dish 36, an axially directed engaging portion 45b for engaging (Fig. 27) the penny ratchet wheel 19 when the pawl 45 is in its inward rocked position, a nose 45c (Figs. 8 and 27) which in the raised position engages against the lug 44b of the latch lever whereby the penny ratchet pawl 45 is latched in the outward position against engagement with the penny ratchet wheel 19, but which upon movement of the lug 44b is released so that the penny ratchet pawl 45 may rock inward under the urgency of its spring 46 into engaging position as shown in Figure 27. On this side of the dish likewise is provided the selector spring 42 which is held adjacent its center by a struck-up lug 36k of dish 36, and which engages at one end through a slot 36v in dish 36 with the selector actuating lever 41 and at the other end with the latch lever 44.

The dish 36 is likewise provided with an aperture 36a to receive the projecting fingers 48f (Figs. 7, 8 and 10) of the crank arm 48, whereby the dish may be assembled upon and removed from the crank 48 easily, but is always held in positive driving relationship with the same. A blade spring 47 on the periphery of the dish 36 acts as a friction member against the interior of the casing 4 except when this member comes opposite a slot 4s (Fig. 24) at the bottom of casing 4 and thus serves to prevent reverse movement from the position of Figures 10 and 24, in a clockwise direction in these figures.

The penny ratchet wheel 19 (Figs. 9 and 12) has apertures 19a in which are received the lugs 49a of a thus loosely mounted dollar transfer pawl 49 having a lug 49b guided and limited by the slot 19b of the penny ratchet wheel 19, and a transfer driving lug 49c extending through an aperture 19c of the penny ratchet 19 and including an inwardly bent end 49d. Normally, as the penny ratchet 19 turns about the axis of the shaft 18, which is fixed to it, the dollar transfer pawl 49 is carried freely along, and the inwardly extending portion 49d may rest and drop each time the pawl comes opposite a lug 22a on the dollar and on the transfer and locking plate 22 (Figs. 5 and 6). Meanwhile, one of the lugs 22a has been resting in the notch of a transfer latch 53 (Figs. 9 and 18) having the offset lugs 53a and 53b which are engaged in the cut away portions 50a and 50b of the dollar transfer cam 50 which is secured by its feet 50c to the inner wall of the casing 4, as by spot welding, and is provided with an upper arcuate surface 50d extending substantially 36° about the axis of shaft 18 for engaging and holding the portion 49d of the dollar transfer pawl 49 in an inward position in which it engages a transfer lug 22a and moves the same through one-tenth of a revolution. The offset bracket 50e of the fixed cam piece 50 supports an intermediate loop of a wire spring 52 which engages at one end (Figs. 9 and 12) beneath the offset lug 53b and at the other end beneath an outwardly extending lug 51a (Figs. 9, 12, 19 and 21) of a penny pawl retaining ratchet 51 having an offset lug 51b extending through an aperture 50g of the stationary cam 50, whereby this pawl is pivotally mounted for movement. The pawl 51 has a pawl piece 51c for engaging the penny ratchet 19 and preventing retrograde or counterclockwise movement thereof in the positions of Figures 9, 12 and 19, being held in engagement with the ratchet by the spring 52 as aforesaid. A shield 55 has parallel walls at its right hand end (Figs. 19, 20 and 21) fitting within the parallel walls of the channel shaped retaining pawl 51 whereby this end is limited from radial movement away from the axis of shaft 18, and provided at its other end with a radially extending portion 55a which likewise serves to hold the peripheral flange 55b away from the inner wall of casing 4. Lugs 55c formed integral with the flange 55b engage at either side of the portion 50k of fixed cam 50, and thus prevent movement of the shield 55 in a peripheral direction with respect to the axis of shaft 18, along the inner wall of casing 4. The ends 55d of shield 55, located within the retaining pawl 51 (Figs. 20 and 21) are preferably brought together for engaging the penny ratchet 19 and imposing a frictional drag thereon to prevent free spinning thereof.

The shaft 18 (Figs. 5 and 6) extends through the transfer and locking plate 22, through the dial 25 and supports at its outer end the penny hand 21. A sleeve 23 supports the dollar hand 24 and is relatively movable both with respect to shaft 18 and to the dial 25, but is fixed to the dollar transfer and locking plate 22.

The operation of the structure may now be described in respect to the sizing and registering operations for a particular coin.

When the crank handle 14 of the power unit is turned in a clockwise direction in Figure 2, the arms 16 are turned with respect to the lugs 3a of the power ratchet 3, and the spring 12, located with its ends connected to the winding shaft 15 and to the stationary power casing 5, is wound so that upon release of the handle 14, one of the ends of blade 16 will engage a lug 3a and tend to rotate the power ratchet 3, and thus cause the upstanding lug 3b thereof to engage the driving crank 54 to turn it and therewith the crank 48 in a clockwise direction in Figures 7, 8, 9, 12 and 27, corresponding to a counter-clockwise direction in Figures 10, 24, 25, 26 and 28. The lugs 48f of crank 46 engage the dish 36 and tend to turn it in the same direction. In the resting position of the parts (Figs. 9 and 10) the projecting lug 36a is engaged in the end 4x of the slot 4y in the casing and prevents these parts from turning.

When any coin of a denomination for which the bank has been constructed, is inserted in the mechanism, the following cycle occurs:

Let it be supposed that a United States silver piece of 25 cents is used. The coin is inserted in slot 4y and pressed in. The coin sizing block 38 yields and carries with it the coin sizing lever 39 and the link 40 so that the selector actuating lever 41 is rotated about its pivot and the T lug 41b moves the selector lever 43 so that the end lug 43d thereof is carried inwardly toward the axis of shaft 18 until it lies at a point concentric with the "quarter" lug 35d fixed to the casing. At this time the penny pawl 45 is in its outermost position (Fig. 8) and its end 45c is resting against the lug 44b of latch lever 44.

The insertion of the coin, however, has depressed the lug 36a which has been holding the dish 36 against rotation under the urgency of the power spring 12. This power spring now tends to move the dish 36, with a coin therein, in a counter-clockwise direction in Figure 10, and thus causes the sequence of operation shown in Figures 24, 25, 26, and 28. Depending on the value of the coin, at first there is an idle travel of the dish. Ultimately, the relative movement of dish 36 with respect to the plate 35 fixed to the casing, results in the presentation of the lug 43d against the fixed lug 35d, so that further movement of the dish 36 is accompanied by a relative dwell of the selector lever 43, which slides on the T lug 41b and pulls on latch lever 44 so that the lug 44b thereof is moved from the position of Figure 8 to the position of Figure 27, resulting in a release of the penny pawl 45 and its inward movement under the action of spring 46. The lug 45b of penny pawl 45 now engages between the two presented teeth of the penny ratchet 19, and further movement of the dish 36 is accompanied by an equi-angular movement of the penny ratchet 19. Since the lug 35d is in a definite fixed position, on the casing, relative to the stationary parts, it operates at a definite angle of travel of the dish 36.

During the driving of the penny ratchet 19 by lug 45b, the retaining pawl 51 operates by its tooth 51c to prevent any retrograde movement of the penny ratchet 19, this tooth 51c yielding outward and then returning as long as the penny ratchet is being turned.

In the given instance, where a quarter has been inserted, the penny ratchet wheel 19 is turned by 25 teeth before the lug 45b encounters the nose or outer surface of the free end of the retaining pawl 51, which also operates as a throwout cam for the penny pawl 45. It may be remarked that in similar manner the penny lug 35a is at such an angular distance from the nose of the retaining pawl 51 that the selector lever 43 is energized to release lug 45b only one tooth prior to the throw-out of this lug again. In similar manner, the nickel lug 35b permits a five-tooth movement; the dime lug 35c a ten-tooth movement, and the half dollar lug 35e a fifty-tooth movement or a fully half revolution.

As the lug 45b comes against the pawl 51, the latter strips it from engagement with the penny ratchet 19, and it will be noted that the inward pressure of the pawl lug 45b forces the retaining tooth 51c more tightly against the penny ratchet 19 so that any spinning of the latter is inhibited. The lug 45b is thus restored to the outermost position shown in Figure 10, and then the latch lever 44 is snapped back by spring 42 to hold penny pawl 45 in its outermost position again.

As the selector lever 43 was momentarily stopped by the fixed lug 35d in the illustrated example, it has been pulled relatively backward, so to speak, with respect to the selector actuating lever 41 on which it is mounted, so that the T lug 41b thereof is brought into engagement with an inclined face of the slot 43a, and the end 43d is shifted in a relative radial direction with respect to shaft 18 until this lug 43d is clear of the fixed lug 35d, whereupon the spring 42 operates to pull the latch lever 44 and the selector lever 43 back into their original positions insofar as permitted by the end 45c of the penny pawl 45, and upon outward movement of this latter, the parts return to the position exactly as shown in Figures 8 and 28.

The twenty-five-tooth movement of penny ratchet 19 (one-fourth of a revolution in the illustrated case) carries with it the shaft 18 and the penny hand 21, so that the latter passes, for example, from indicating "zero" cents to a position indicating "twenty-five" cents.

The lug 45b continues its movement, being held against any accidental inward displacement by the shield wall 55b. Ultimately, the coin tray comes opposite a slot 4s in the casing 4 (Fig. 26) and the action of spring 42 upon the selector actuating lever 41 and through link 40 and coin sizing lever 39 causes the block 38 to eject the coin so that it falls into the receptacle 1. During the movement thus occasioned, the selector lever 43 returns to its original position with respect to the peripheral wall of the dish 36, as shown in Figure 10. At this time it is not possible to reverse the direction of rotation of the dish and restore the parts to zero, as the friction piece 47 will engage in the end 4x of the slot in casing 4 and prevent such movement.

One end of the slot 4s is formed as a cam 4v to assist in forcing the lug 48a inward again so that it may again travel within the casing 4.

An idle movement now occurs until the lug 38a again snaps into the large end 4x of the slot in casing 4. The parts have now returned to the original position and the device is ready for the insertion of a further coin.

In this original position, the friction piece 47 is engaged in the coin ejecting slot 43, so that retrograde movement from this position is thus limited.

In order further to prevent retrograde movement of the parts, the curved advancing end of the penny pawl lug 45b slips behind the projection 51d on the retaining pawl 51 shortly after the coin has been ejected from the dish 36 into the receptacle 1.

It will be noted that the registering operations are accomplished by a movement of rotation always in the same direction, and that the system may be operated by a power device. However, such a power device need not be employed, as it may be omitted and the crank 54 merely provided (Figs. 3 and 4) with a knob 54x for hand rotation. It is then necessary to move this knob 54x during the registering operation, but the aforesaid preventers of retrograde movement prevent any false operation and insure the definite return, through a complete cycle, of all parts before a further coin may be inserted, and prevent the withdrawal of a once inserted coin, so that the register cannot be moved except after the coin has been moved from any position in which it may be withdrawn.

The successive deposit and registry of coins ultimately causes the penny ratchet 19 to pass through more than 360° of movement, i. e. more than one dollar in total value of coins has been registered. When the penny ratchet 19 has moved, for example, to a position corresponding to the deposit of ninety cents, the lug 49c of its transfer pawl 49 engages the transfer latch 53 and depresses the latter to free the dollar transfer lug 22a which has been retained therein. At this angular position, also, for example, the pawl lug 49d engages the dollar transfer lug 22a. During the passage of the penny ratchet 19 from the position corresponding to ninety cents to that corresponding to one dollar, the lug 49d moves lug 22a through an equi-angular distance, so that the dollar transfer disk 22 is likewise rotated and therewith the sleeve 23 and the dollar hand 24, so that upon the deposit of coins totaling one dollar, the penny hand 21 indicates "zero" again, while the dollar hand has moved to the position "1".

As the lug 49d leaves the transfer latch 53, it permits this latch to return, but the next dollar transfer lug 22a rides against the inclined nose, again depressing the latch 53 until the latter can snap back in a position for preventing any rotative movement of the lug 22a and therewith of the dollar transfer disk 22, in either direction.

Any desired form of closure may be employed for the coin receptacle 1, as for example that shown in my United States Patent 1,939,353, and illustrated in Figure 5 as comprising a door 200 held by a latch piece 201 extending through a hole 202 in the bottom of casing 4 so that it is presented opposite the periphery of the dollar disk 22, and may only be moved upwardly when the notch 22x of this disk is in position above it, and serving upon its upward movement to release the door 200 so that the contents may be removed. Normally, the notch 22x is located so that it comes opposite the rod 201 when the dollar disk is passing from "9" to "zero".

It is obvious that the invention is not limited to the details of construction shown, but that it may be employed in many ways within the scope of the appended claims.

Having thus described the invention, what I claim as new and desire to secure by Letters Patent, is:

1. In a device of the class described, a coin sizing member, a registering element, a pawl, a revoluble pawl support, a pawl latch for holding said pawl out of engagement with said element, a latch releasing device carried by said pawl support and controlled in position by said member, a plurality of fixed stops selectively engageable by said device for releasing said pawl and positioned angularly about the axis of revolution of said support according to the denominations of coins to be sized, means for revolving said pawl support, and a fixed device for disengaging said pawl from said element.

2. In a device of the class described, a casing, a spring connected at one end to said casing, means for winding said spring and including a shaft to which the other end of the spring is connected, a click connected to said shaft, a rotatable member driven by said spring through said click, means for limiting the speed of said rotatable member, a revoluble member, a coin sizing member, a registering element, means for differentially connecting said coin sizing member and element for rotating said element through an angular distance corresponding to the denomination of a coin being sized, and a driving connection between said rotatable and revoluble members.

3. In a device of the class described, a casing having a peripheral coin aperture, a revoluble member having a coin holder with a peripheral aperture, a coin sizing mechanism pivoted on said revoluble member and cooperative with said holder, a detent connected to said coin sizing member for normally arresting said revoluble member with said apertures in alignment, a registering element, a pawl pivoted to said revoluble member, a pawl latch for holding said pawl normally out of engagement with said revoluble member, a plurality of value determining members on the casing, means controlled by the position of the coin sizing member and thereby positioned for selective engagement with a said value determining member and operating for releasing said pawl latch, and a device attached to said casing for disengaging said pawl from said element.

4. In a device of the class described, a casing having sizing lugs radially and angularly spaced, a revoluble tray and means for revolving the same, said tray including a coin holder, a pivoted sizing member on said tray, a pivoted lever connected to the sizing member, a registering element, a pawl, a pawl latch, a latch trip connected to said latch and to said lever and moved by said lever toward and from the axis of said revoluble member so that it is positioned for selecting and engaging the sizing lug corresponding to the denomination of the coin in said holder, said sizing lug operating when engaged to delay the trip whereby to release the latch, means for producing a further movement of said trip relative to said axis after said release whereby to disengage the trip from the lug, and a device for disengaging the pawl from said element.

HARRY T. KINGSBURY.